(12) United States Patent
Kao et al.

(10) Patent No.: US 6,515,653 B2
(45) Date of Patent: Feb. 4, 2003

(54) KEYBOARD CONTROL SYSTEM CONTAINING MANUFACTURE'S IDENTIFICATION CODE AND MULTIPLE SELECTION MATRIX

(75) Inventors: Chao-Ting Kao, Taipei Hsien (TW); Chin-Cheng Shen, Taichu (TW)

(73) Assignee: Winbond Electronics Corp., Hsinchu (TW)

( * ) Notice: Subject to any disclaimer, the term of this patent is extended or adjusted under 35 U.S.C. 154(b) by 157 days.

(21) Appl. No.: 09/788,702

(22) Filed: Feb. 20, 2001

(65) Prior Publication Data

US 2002/0024504 A1 Feb. 28, 2002

(30) Foreign Application Priority Data

Jul. 12, 2000 (TW) ........................................ 89113837 A

(51) Int. Cl.[7] .................................................. G09G 5/00
(52) U.S. Cl. ........................ 345/168; 345/170; 708/142; 400/477
(58) Field of Search ................................. 345/156, 158, 345/168, 169, 170, 171, 172–178; 341/22; 708/142–145; 710/1, 5; 712/1, 20, 21; 400/472, 488, 489, 484–487, 490, 491

(56) References Cited

U.S. PATENT DOCUMENTS 5,349,344 A * 9/1994 Head ..................... 340/825.23
5,523,755 A * 6/1996 Wooten ....................... 341/22
5,991,546 A * 11/1999 Chan et al. .................. 710/62

* cited by examiner

Primary Examiner—Bipin Shalwala
Assistant Examiner—Mansour M. Said
(74) Attorney, Agent, or Firm—J. C. Patents

(57) ABSTRACT

A keyboard control system that contains a manufacturer's identification code and a multiple selection matrix. This invention utilizes all the existing LED leads on a keyboard controller. Using the period between initial setting and normal operation together with triggering signals, user or customer is able to pick up suitable data from a single keyboard controller. In addition, the invention is capable of using the same leads for connecting to external serial EEPROM so that new data not included among the preset data within the keyboard controller can still be input to the controller. Furthermore, the same type of technique can be used to increase the number of combinations in different application areas as long as more keyboard controller input/output ports are available.

16 Claims, 3 Drawing Sheets

KEYBOARD CONTROL SYSTEM CONTAINING MANUFACTURE'S IDENTIFICATION CODE AND MULTIPLE SELECTION MATRIX

CROSS-REFERENCE TO RELATED APPLICATION

This application claims the priority benefit of Taiwan application serial no. 89113837, filed Jul. 12, 2000.

BACKGROUND OF THE INVENTION

1. Field of Invention

The present invention relates to a type of multiple selection architecture. More particularly, the present invention relates to a keyboard control system having a manufacturer's identification code and a multiple selection matrix. The keyboard control system uses simple circuits and a few keyboard controller leads in addition to sharing with the LED input/output port. The said system is capable of finding much needed data from the keyboard controller or reading the data from an external serial EEPROM.

2. Description of Related Art

Nowadays, most peripheral device controllers of personal computers can perform a variety of sophisticated functions through integration. The aim of integrating various functions is to simplify circuit connection and miniaturize the final product. Some products are even capable of operating as a single controller. Consequently, controller suppliers are developing products having groups of parameters that can be set by customers on demand. The reason for developing single controller with groups of programmable parameters is to provide customer a product that can be applied under a variety of conditions, thereby saving product and stock-up cost. The reason for developing single controller is particularly strong in the case of keyboard products used on personal computers.

Most keyboard manufacturers manufacture OEM equipment. In other words, keyboard manufactures often have to provide products having different configuration and model to customers. Frequently, each customer demand a particular identification code, keyboard matrix arrangement, product serial number and functions. With regard to various OEM manufacturers or product manufacturers, the types of techniques used can be roughly divided into three categories, namely:

1. Fixed type: A group of customer-related data is installed inside the same type of controllers, and hence the product and integrated circuit (IC) manufacturers must provide a controller to each corresponding customer. However, this type of arrangement tends to increase cost in data preparation and product stocking.

2. External EEPROM: All variable or customer data are put into an external serial EEPROM outside the controller so that the controller contains none of these data. Although this method is able to unite the design of the controller so that different customers can use the same type of controller, the need for the external EEPROM adds some cost to the product.

3. A selection method (that differs from this invention): Using the n input/output ports of a controller, an external logic involving a combination of '1's and '0's to form $2^n$ selections. Although this method permits the holding of several groups of preset data inside the controller, there is no provision for resolving exceptions and there is no external backup for inputting any data from external devices. Moreover, high-demand input/output ports of the controller must be used.

Hence, how to accommodate all these different data inside a single controller and provide the capacity to channel new data into the controller via a supporting device at the same time is a major target for the future.

SUMMARY OF THE INVENTION

Accordingly, one object of the present invention is to provide a keyboard control system that includes a manufacturer's identification code and a multiple selection matrix therein. The keyboard controller system includes a keyboard controller, three LED current-limiting resistors, three LED indicator lights and six jumpers. The keyboard controller includes an LED0 lead, a LED1 lead, a LED2 lead, a first input/output port and a second input/output port. One end of the first LED current-limiting device, the second LED current-limiting device and the third current-limiting device are connected to a voltage source. The positive terminal of the first LED indicator light is connected to the other terminal of the first LED current-limiting device while the negative terminal is connected to the keyboard controller LED0 lead. The positive terminal of the second LED indicator light is connected to the other terminal of the second LED current-limiting device while the negative terminal is connected to the keyboard controller LED1 lead. The positive terminal of the third LED indicator light is connected to the other terminal of the third LED current-limiting device while the negative terminal is connected to the keyboard controller LED2 lead. The first jumper is positioned between the first input/output port and the LED0 lead; the second jumper is positioned between the first input/output port and the LED1 lead; and the third jumper is positioned between the first input/output port and the LED2 lead. Similarly, the fourth jumper is positioned between the second input/output port and the LED0 lead; the fifth jumper is positioned between the second input/output port and the LED1 lead; and, the sixth jumper is positioned between the second input/output port and the LED2 lead.

Only one of the first, the second and the third jumpers formed a first set is turned on, and one of the fourth, the fifth and the sixth jumpers formed a second set is turned on, and the first and the second sets operate independently. The first, the second, the third, the fourth, the fifth and the sixth jumpers are located within an electrically erasable and programmable read only memory (EEPROM). The EEPROM is used for storing a client-requirement data for inputting into the keyboard controller. In addition, the first, the second and the third LED current-limiting device are selected from a group consisting of a resistor, an inductor and a conductive wire.

The present invention further provides a multiple selection method of a keyboard controller having a manufacturer's identification code and a multiple selection matrix therein. First, the keyboard controller is set in an initial period. A first data is then acquired through a plurality of input/output ports of the keyboard controller by reading timings from a SCLK and a SDATA leads of a serial EEPROM. Then, it determines whether the first data is meaningless, wherein if the first data is meaningless, the keyboard controller is externally connected to the serial EEPROM and then read data stored in the serial EEPROM to the keyboard controller, else the keyboard controller is not externally connected to the serial EEPROM and an internal data selection within the keyboard controller is performed.

The internal data selection is performed by setting a plurality of jumpers and a plurality of LED leads to select a jumper configuration corresponding to the keyboard controller from a built-in table.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
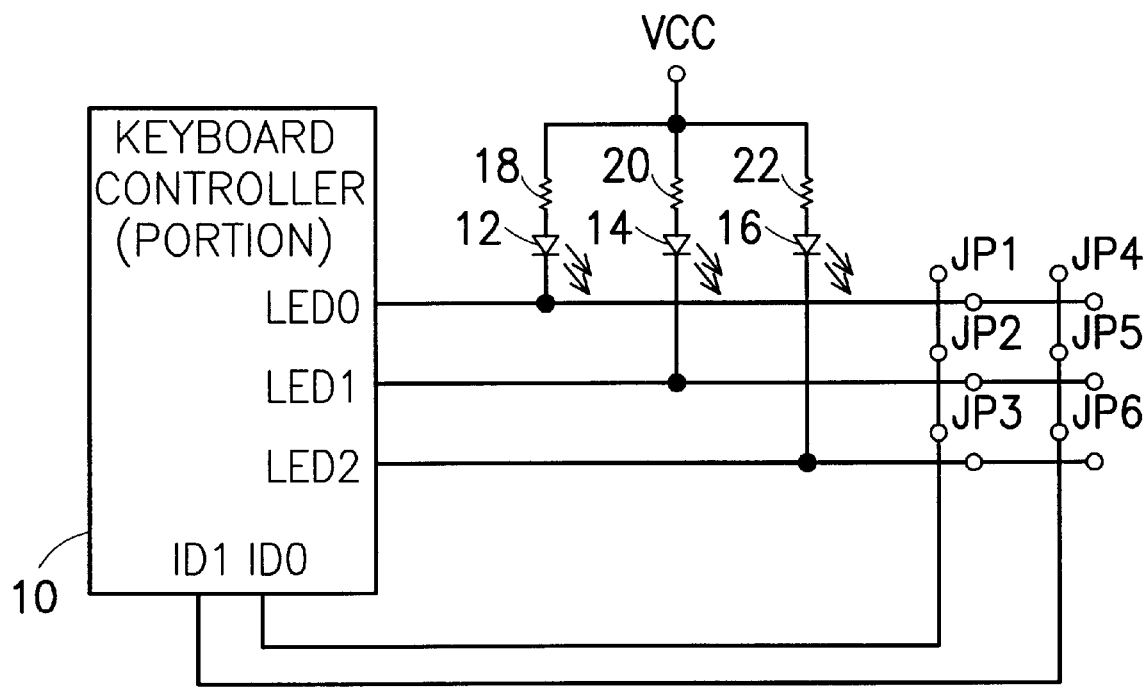
FIG. 1 is a diagram showing the connections between the elements of a keyboard controller system having a manufacturer's identification code and a multiple selection matrix therein according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

According to application techniques of keyboard, scan matrix occupies most of the control leads and is likely to demand more in the future. In addition, since leads must be used for the LED indicator lights, total number of available leads available will drop. This invention uses simple circuits and the minimum number of controller leads. Moreover, some of the controller leads share with LED input/output ports. Consequently, the controller can pick up necessary data (capable of accommodating 16 groups or more). Alternatively, an external serial electrical erasable programmable read-only-memory (EEPROM) can be used to supply corresponding data to the controller. The following is a detailed description of the technical aspect of this invention.

FIG. 1 is a diagram showing the connections between the elements of a keyboard controller system having manufacturer's identification code and a multiple selection matrix therein according to one preferred embodiment of this invention.

As shown in FIG. 1, the system includes a keyboard controller 10, three LED indicator lights (12, 14 and 16), three LED current-limiting resistors (18, 20 and 22), and six jumpers (JP1, JP2, JP3, JP4, JP5 and JP6). The six jumpers JP1~JP6 can be independently opened or closed.

The positive terminal of the LED indicator light 12 is connected to one terminal of the LED current-limiting resistor 18 while the negative terminal is connected to the keyboard controller lead LED0. The other terminal of the LED current-limiting resistor 18 is connected to a voltage source VCC. The positive terminal of the LED indicator light 14 is connected to one terminal of the LED current-limiting resistor 20 while the negative terminal is connected to the keyboard controller lead LED1. The other terminal of the LED current-limiting resistor 20 is connected to the voltage source VCC. The positive terminal of the LED indicator light 16 is connected to one terminal of the LED current-limiting resistor 22 while the negative terminal is connected to the keyboard controller lead LED2. The other terminal of the LED current-limiting resistor 22 is connected to the voltage source VCC. The jumper JP1 is positioned between the input/output port ID0 and the lead LED0 of the keyboard controller 10. The jumper JP2 is positioned between the input output port ID0 and the lead LED1 of the keyboard controller 10. The jumper JP3 is positioned between the input output port ID0 and the lead LED2 of the keyboard controller 10. Similarly, the jumper JP4 is positioned between the input/output port ID1 and the lead LED1 of the keyboard controller 10. The jumper JP5 is positioned between the input output port ID1 and the lead LED1 of the keyboard controller 10. The jumper JP6 is positioned between the input output port ID1 and the lead LED2 of the keyboard controller 10.

Figure 2:
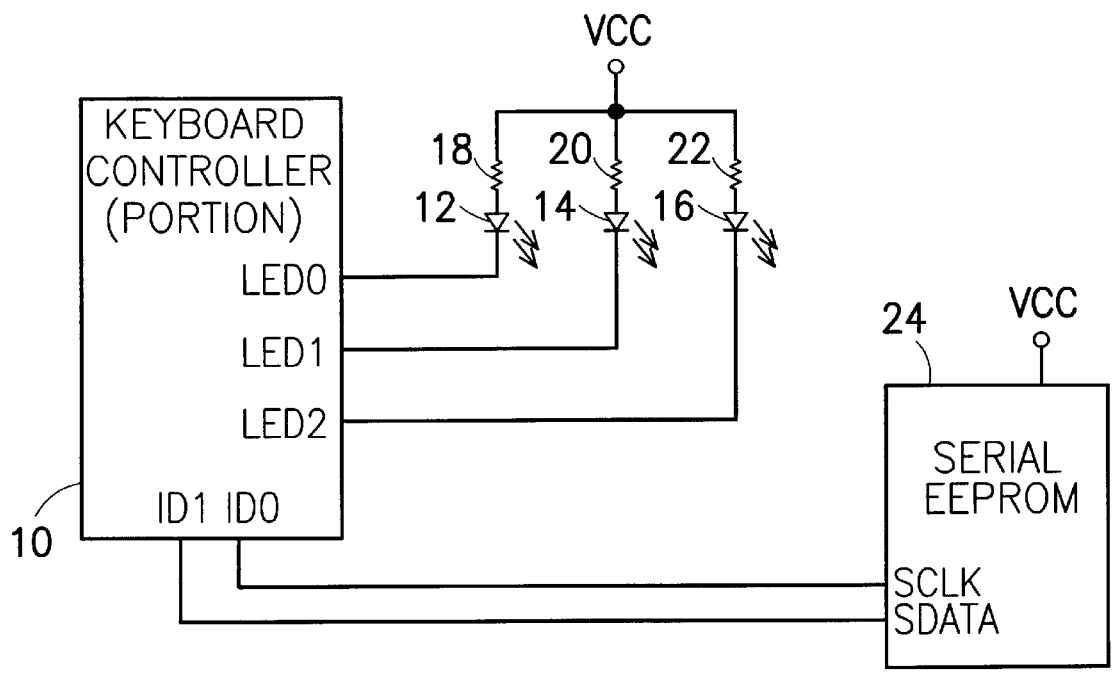
FIG. 2 is a diagram showing the application of the keyboard controller system of this invention to an external serial EEPROM.
Figure 3:
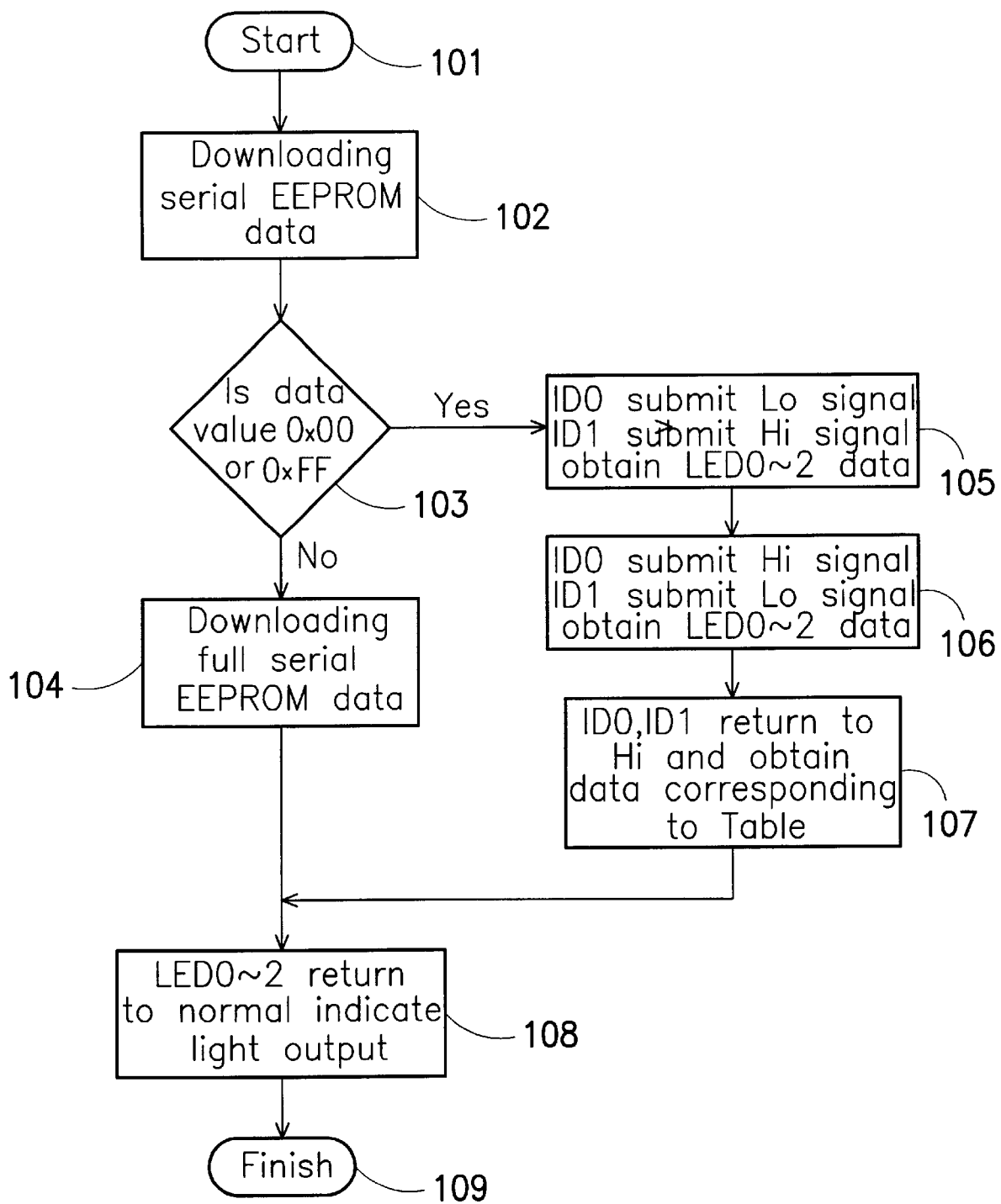
FIG. 3 is a flow chart showing the steps for using the keyboard controller system of this invention.

FIG. 2 is a diagram showing the application of the keyboard controller system of this invention to an external serial EEPROM. FIG. 3 is a flow chart showing the steps for using the keyboard controller system of this invention.

As shown in FIG. 3, the keyboard controller 10 starts out in step 101. Through the input/output port leads ID0 and ID1, the keyboard controller 10 read out a first batch of data from a serial EEPROM 24 in step 102 (refer to FIG. 2) via the SCLK lead and the SDATA lead.

In step 103, the first batch of data from the EEPROM is checked to determine if the value obtained has the gibberish value 0x00 or 0xff or not. If the result is negative indicating that the keyboard controller 10 is connected to the serial EEPROM 24, step 104 is carried out to download a full batch of data from the serial EEPROM into the keyboard controller 10 and then jump to step 108. On the other hand, if gibberish value 0x00 or 0xff is received by the keyboard controller 10 indicating the absence of the serial EEPROM 24 (failure of the serial EEPROM is not under consideration), data is selected from the keyboard controller in step 105.

In step 105, jumpers JP1~JP6 are set to pick up a particular internal configuration. IDO output a low (Lo) pulse while ID1 maintains a high potential (Hi) so that the settings of jumpers JP1~JP3 is obtained through the potential at the three leads LED0~2 as shown in FIG. 1.

In step 106, ID0 maintains at a high level (Hi) while ID1 sends out a low (Lo) pulse so that the settings of jumpers JP4~JP6 is similarly obtained through the potential at the three leads LED0~2.

After steps 105 and 106, settings of the jumpers JP1~JP6 are obtained. However, the settings of the jumpers JP1~JP6 must prevent subsequent interference of the LED indicator lights 12, 14 and 16. Consequently, jumpers JP1~JP3 cannot set up more than two groups of open or short circuits at the same time. This also applies to jumpers JP4~JP6 as well. Hence, jumpers JP1~JP6 together can form 16 combination types as shown in supplementary table 1. Up to this point, the keyboard controller 10 has selected one out of the 16 groups of data via the jumper settings.

| Supplementary Table No. 1: '1' indicates a short circuit and '0' indicates an open circuit ||||||| 
|---|---|---|---|---|---|---|
| Group | JP1 | JP2 | JP3 | JP4 | JP5 | JP6 |
| 1 | 0 | 0 | 0 | 0 | 0 | 0 |
| 2 | 0 | 0 | 0 | 0 | 0 | 1 |
| 3 | 0 | 0 | 0 | 0 | 1 | 0 |
| 4 | 0 | 0 | 0 | 1 | 0 | 0 |

-continued

Supplementary Table No. 1: '1' indicates a short circuit and '0' indicates an open circuit

| Group | JP1 | JP2 | JP3 | JP4 | JP5 | JP6 |
|-------|-----|-----|-----|-----|-----|-----|
| 5     | 0   | 0   | 1   | 0   | 0   | 0   |
| 6     | 0   | 0   | 1   | 0   | 0   | 1   |
| 7     | 0   | 0   | 1   | 0   | 1   | 0   |
| 8     | 0   | 0   | 1   | 1   | 0   | 0   |
| 9     | 0   | 1   | 0   | 0   | 0   | 0   |
| 10    | 0   | 1   | 0   | 0   | 0   | 1   |
| 11    | 0   | 1   | 0   | 0   | 1   | 0   |
| 12    | 0   | 1   | 0   | 1   | 0   | 0   |
| 13    | 1   | 0   | 0   | 0   | 0   | 0   |
| 14    | 1   | 0   | 0   | 0   | 0   | 1   |
| 15    | 1   | 0   | 0   | 0   | 1   | 0   |
| 16    | 1   | 0   | 0   | 1   | 0   | 0   |

In step 108, data selection is at an end. Data is downloaded no matter if the data is selected by jumpers JP1~JP6 or from the external serial EEPROM 24. Therefore, the leads LED0~2 reverts to a normal output port for LED indication. All operations end in step 109.

In summary, this invention concentrates on using all existing LED leads of a keyboard controller. Utilizing the period between initial setting and normal operation together with triggering signals, user or customer is able to pick up suitable data from a single keyboard controller. In addition, the invention is capable of using the same leads for connecting to an external serial EEPROM so that new data not included among the preset data within the keyboard controller can still be input to the controller. Furthermore, the same type of technique can be used to increase the number of combinations in different application areas so long as more keyboard controller input/output ports are available. Hence, more variation and flexibility of the controller are obtained.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard controller having a manufacturer's identification code and a multiple selection matrix therein, comprising:
   a keyboard controller having a plurality of LED leads and a plurality of input/output ports;
   a plurality of LED current-limiting devices, each having one terminal connected to a voltage source;
   a plurality of LED indicator lights, each having a positive terminal connected to the other terminal of the corresponding LED current-limiting device and a negative terminal connected to the corresponding LED lead of the keyboard controller;
   a plurality of jumpers, each positioned between one of the input/output ports and each LED lead;
   wherein only one of the jumpers is turned on at the same time.

2. The keyboard controller of claim 1, wherein the LED current-limiting devices further comprises:
   a first LED current-limiting device having one terminal connected to the voltage source;
   a second LED current-limiting device having one terminal connected to the voltage source; and
   a third LED current-limiting device having one terminal connected to the voltage source.

3. The keyboard controller of claim 2, wherein the LED indicator lights further comprises:
   a first LED indicator light having a positive terminal connected to the other terminal of the first LED current-limiting device and a negative terminal connected to the keyboard controller LED0 lead;
   a second LED indicator light having a positive terminal connected to the other terminal of the second LED current-limiting device and a negative terminal connected to the keyboard controller LED1 lead; and
   a third LED indicator light having a positive terminal connected to the other terminal of the third LED current-limiting device and a negative terminal connected to the keyboard controller LED2 lead.

4. The keyboard controller of claim 3, wherein the jumpers further comprises:
   a first jumper positioned between the first input/output port and the LED0 lead;
   a second jumper positioned between the first input/output port and the LED1 lead;
   a third jumper positioned between the first input/output port and the LED2 lead;
   a fourth jumper positioned between the second input/output port and the LED0 lead;
   a fifth jumper positioned between the second input/output port and the LED1 lead; and
   a sixth jumper positioned between the second input/output port and the LED2 lead,
   wherein only one of the first, the second and the third jumpers formed a first set is turned on, and one of the fourth, the fifth and the sixth jumpers formed a second set is turned on, and the first and the second sets operate independently.

5. The keyboard controller of claim 4, wherein the first, the second, the third, the fourth, the fifth and the sixth jumpers are located within an electrically erasable and programmable read only memory (EEPROM).

6. The keyboard controller of claim 5, wherein the EEPROM is used for storing a client-requirement data for inputting into the keyboard controller.

7. The keyboard controller of claim 5, wherein the first, the second, the third, the fourth, the fifth and the sixth jumpers are located within a non-volatile memory.

8. The keyboard controller of claim 5, wherein the EEPROM is used for storing a client-requirement data for inputting into the keyboard controller.

9. The keyboard controller of claim 2, wherein the first, the second and the third LED current-limiting device are selected from a group consisting of a resistor, an inductor and a conductive wire.

10. A keyboard controller having a manufacturer's identification code and a multiple selection matrix therein, comprising:
    a keyboard controller having at least one LED lead and at least one input/output ports;
    at least one LED current-limiting device having one terminal connected to a voltage source;
    at least one LED indicator light having a positive terminal connected to the other terminal of the LED current-limiting device and a negative terminal connected to the keyboard controller LED lead;

at least one jumper positioned between the input/output port and the LED lead;

wherein the first, the second and the third jumpers respectively coupled to the input/output ports and the first input/output port forms a plurality of jumper sets, only one jumper in the jumper set is turned on, and the jumper sets operate independently.

11. The keyboard controller of claim 10, wherein the jumper is located within an electrically erasable and programmable read only memory (EEPROM).

12. The keyboard controller of claim 10, wherein the EEPROM is used for storing a client-requirement data for inputting into the keyboard controller.

13. The keyboard controller of claim 10, wherein the jumper is located within a non-volatile memory.

14. The keyboard controller of claim 10, wherein the EEPROM is used for storing a client-requirement data for inputting into the keyboard controller.

15. The keyboard controller of claim 10, wherein the first, the second and the third LED current-limiting device are selected from a group consisting of a resistor, an inductor and a conductive wire.

16. A multiple selection method of a keyboard controller having a manufacturer's identification code and a multiple selection matrix therein, comprising:

setting the keyboard controller in an initial period;

acquiring a first data through a plurality of input/output ports of the keyboard controller by reading timings from a SCLK (signal clock) and a SDATA (signal data) leads of a serial EEPROM;

determining whether the first data is meaningless, wherein if the first data is meaningless, the keyboard controller is externally connected to the serial EEPROM and then read data stored in the serial EEPROM to the keyboard controller, else the keyboard controller is not externally connected to the serial EEPROM and an internal data selection within the keyboard controller is performed; and performing the internal data selection by setting a plurality of jumpers and a plurality of LED leads to select a jumper configuration corresponding to the keyboard controller from a built-in table.

* * * * *